United States Patent [19]

Sugiura

[11] 4,151,953
[45] May 1, 1979

[54] THERMOPNEUMATIC ACTUATOR

[75] Inventor: Hiroyuki Sugiura, Konan, Japan

[73] Assignee: Diesel Kiki Company, Ltd., Tokyo, Japan

[21] Appl. No.: 840,598

[22] Filed: Oct. 11, 1977

[30] Foreign Application Priority Data

Oct. 13, 1976 [JP] Japan .............................. 51-121938
Oct. 23, 1976 [JP] Japan .............................. 51-127447
Dec. 29, 1976 [JP] Japan .......................... 51-136375[U]

[51] Int. Cl.² ...................... F15B 13/16; G05D 23/00
[52] U.S. Cl. ........................................ 236/87; 91/365; 137/84
[58] Field of Search .................... 236/87; 91/365, 387; 137/84; 251/28

[56] References Cited

U.S. PATENT DOCUMENTS

| | | | |
|---|---|---|---|
| 3,003,475 | 10/1961 | Rouvalis | 91/387 |
| 3,051,139 | 8/1962 | Thorner | 91/387 X |
| 3,079,898 | 3/1963 | Jensen | 137/85 X |
| 3,222,995 | 12/1965 | Reed | 91/359 |

Primary Examiner—William E. Wayner
Attorney, Agent, or Firm—David G. Alexander

[57] ABSTRACT

A thermopneumatic actuator of the invention is used to control an automobile heater and/or air conditioner to maintain a desired temperature in the automobile passenger compartment through a mechanical output member of the actuator. The output member is connected to and moved by a diaphragm which is positioned by vacuum introduced from the automobile intake manifold and works against a diaphragm spring. A valve is controlled by a bimetal spring exposed to air from the passenger compartment to modulate the vacuum applied to the diaphragm. A feedback spring connected between the diaphragm and the valve works against the bimetal spring. An aspirator comprising a venturi tube causes air flow from the passenger compartment around the bimetal spring.

11 Claims, 19 Drawing Figures

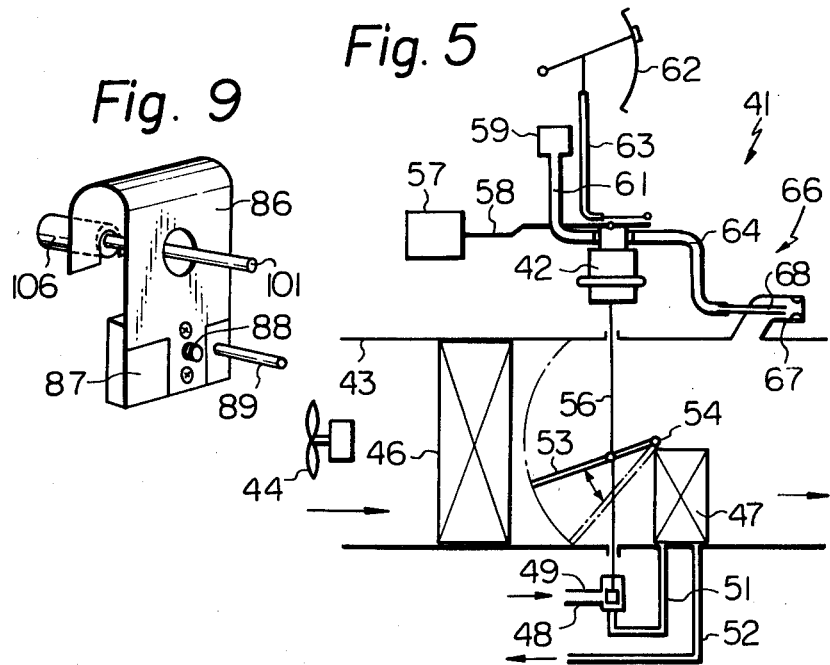
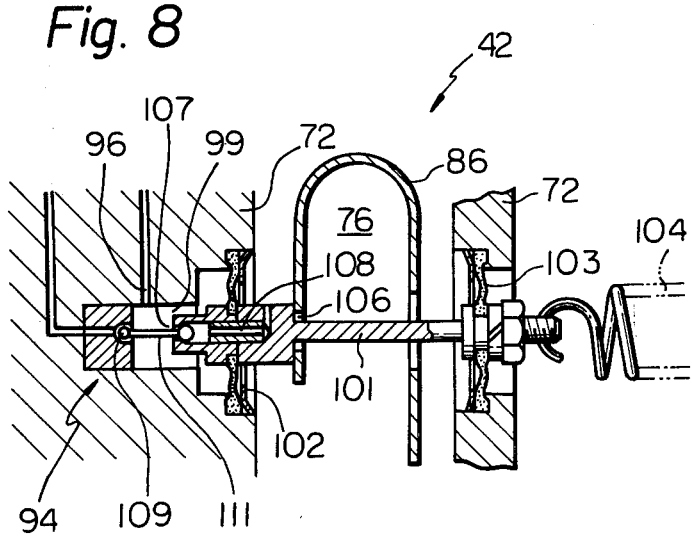

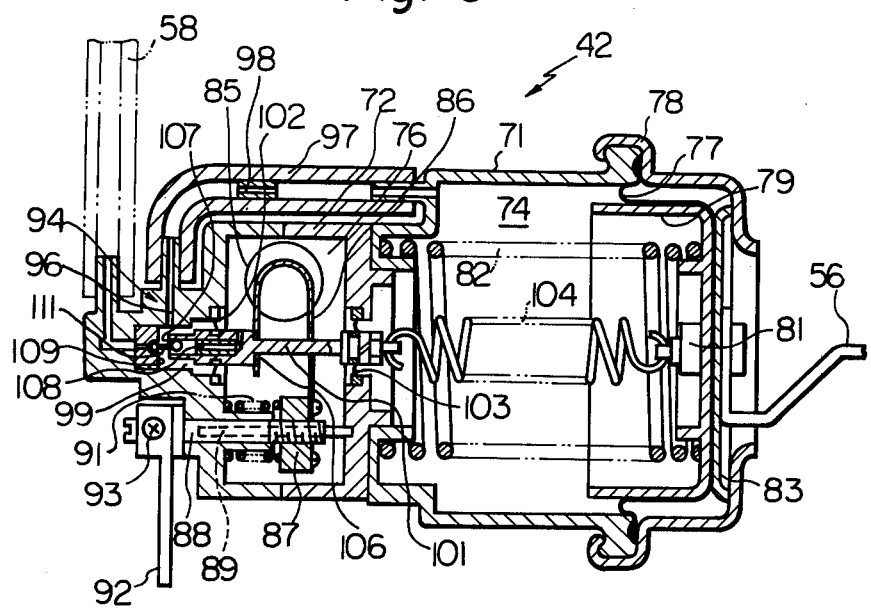
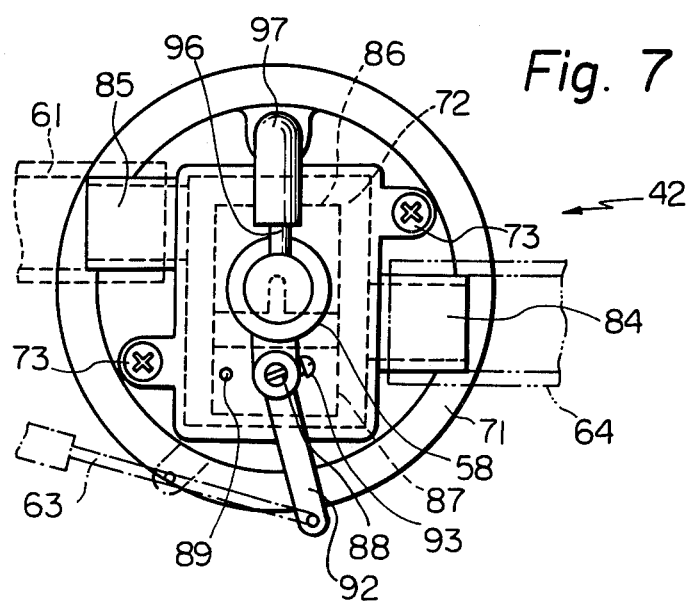

THERMOPNEUMATIC ACTUATOR

BACKGROUND OF THE INVENTION

The present invention relates to a thermopheumatic actuator especially suited for controlling the temperature in the passenger compartment of an automotive vehicle.

Passenger automobiles and trucks are normally provided with heating and air conditioning systems for maintaining the desired temperature in the vehicle passenger compartment. The temperature is controlled by selectively energizing the heating and air conditioning systems and furthermore by positioning a temperature door which controls the mixture of hot and cold air.

The temperature door is generally positioned by means of a vacuum actuator which is fed with modulated vacuum from the vehicle intake manifold. The actuator typically comprises a diaphragm which is positioned by opposing forces of the modulated vacuum and a diaphragm spring. The vacuum actuator may be provided with a power diaphragm and a pilot diaphragm to increase the accuracy and decrease the effects of variations in the mechanical resistance encountered in moving the temperature door.

The vacuum to the actuator is modulated by means of a thermally controlled valve. A bimetal spring exposed to air from the passenger compartment positions a valve element to bleed air into the vacuum actuator and thereby reduce the vacuum as a function of temperature. Such a thermally controlled valve is generally referred to in the art as a thermostatic vacuum regulator.

A system of this type is an open loop control system since there is no mechanical feedback between the diaphragm and the valve. Thus, the system is inherently inaccurate since such factors such as variations in the vacuum applied to the regulator, ageing of the diaphragm, pressure drops between the regulator and the actuator and the like will cause the temperature to be controlled in an erratic manner. In addition, the system is disadvantageous from an installation standpoint since the regulator and actuator are separated units. They must be mounted in separate locations and connected by a conduit, constituting unnecessary consumption of mounting space, installation time and expense.

SUMMARY OF THE INVENTION

The present invention overcomes the above described drawbacks of the prior art by combining a thermostatic vacuum modulator valve and a vacuum actuator into an integral unit and providing mechanical feedback in the form of a feedback spring between a bimetal spring of the modulator valve and a diaphragm of the vacuum actuator, thereby providing a closed loop control system.

It is an object of the present invention to provide a thermopneumatic actuator which is immune to variations in output load.

It is another object of the present invention to provide a thermopneumatic actuator comprising a closed loop servo system which is more accurate than prior art open loop servo systems.

It is another object of the present invention to provide a thermopneumatic actuator comprising an improved aspirator means for causing air flow through the actuator housing.

It is another object of the present invention to provide a thermopneumatic actuator which can be manufactured and installed with increased economy in cost and space.

It is another object of the present invention to provide a generally improved thermopneumatic actuator.

Other objects, together with the foregoing, are attained in the embodiments described in the following description and illustrated in the accompanying drawing.

BRIEF DESCRIPTION OF THE DRAWING

FIG. 5 is a schematic view of a thermopneumatic actuator system embodying the present invention;

FIG. 6 is a longitudinal sectional view of the present actuator;

FIG. 7 is a rear elevation of the present actuator;

FIG. 8 is a fragmentary enlarged sectional view of the present actuator;

FIG. 9 is an enlarged perspective view of a bimetal spring of the present actuator;

DESCRIPTION OF THE PREFERRED EMBODIMENTS

While the thermopneumatic actuator of the invention is susceptible of numerous physical embodiments, depending upon the environment and requirements of use, substantial numbers of the herein shown and described embodiments have been made, tested and used, and all have performed in an eminently satisfactory manner.

Figure 1:
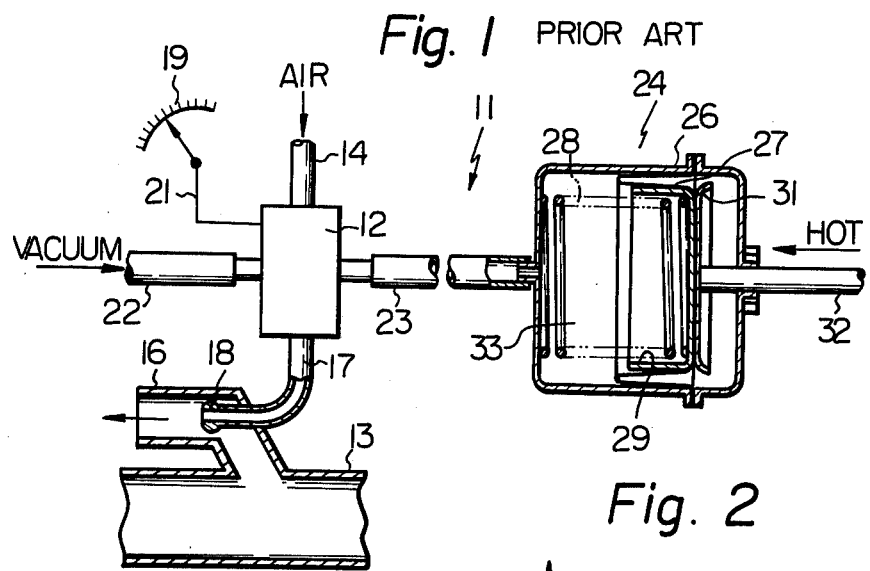
FIG. 1 is a schematic view of a prior art thermopneumatic actuator.

Referring now to FIG. 1 of the drawing, a prior art thermopneumatic actuator system is generally designated by the reference numeral 11 and comprises a thermostatic regulator 12. Temperature controlled air is fed into a vehicle passenger compartment (not shown) through a duct 13. Although not shown in FIG. 1, a heater and air conditioner are provided with switch means and a temperature control door to control the air temperature in the duct 13. An inlet hose 14 is connected at one end to the interior of the passenger compartment and at the other end to the interior of the regulator 12.

A tube 16 leads from the duct 13 and discharges pressurized air from the duct 13 into the atmosphere. A hose 17 which leads from the regulator 12 has its other end flared as indicated at 18 and disposed coaxially inside the tube 16. The flared end of the hose 17 in combination with the inner wall of the tube 16 constitutes a venturi which creates a low pressure area at the opening of the hose 17.

Although the interior of the regulator 12 is not shown in detail, it comprises a bimetal spring and a pressure modulator valve which is controlled by the spring. The initial spring tension and thereby the desired air temperature are set by a dial 19 located inside the passenger compartment and connected to the regulator 12 by a cable 21. The spring is located inside a temperature chamber having an inlet and outlet connected to the hoses 14 and 17 respectively. The tube 16 and flared end of the hose 18 constitute an aspirator which sucks air from the passenger compartment through the regulator 12 by the venturi effect.

Figure 2:
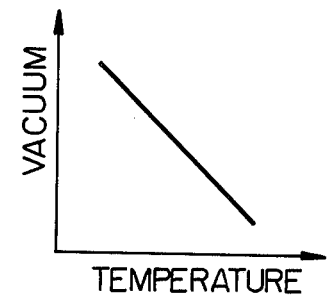
FIGS. 2, 3 and 4 are graphs illustrating the operation of the prior art actuator shown in FIG. 1.

The valve of the regulator 12 has an inlet connected to the intake manifold of the vehicle (not shown) through a hose 22 of an outlet connected to a vacuum actuator 24 through a hose 23. The regulator 12 serves to modulate the vacuum from the intake manifold in accordance with FIG. 2. In brief, the regulator 12 decreases the vacuum as the air temperature inside the passenger compartment increases.

The actuator 24 comprises a housing 26 which is partitioned by a flexible diaphragm 27. A diaphragm spring 28 urges the diaphragm 27 rightwardly through a spring retainer cup 29 which is fixed to the center of the diaphragm 27. Another cup 31 is fixed to the diaphragm 27 and carries an output rod 32 which is connected to the temperature control door and switches to control the temperature in accordance with the axial position of the rod 32. The temperature is increased as the rod 32 is moved leftwardly. The diaphragm 27 constitutes a wall of a pressure chamber 33 inside the housing 26, with the pressure in the pressure chamber 33 being negative gage pressure or vacuum from the vehicle intake manifold as modulated by the regulator 12. The diaphragm 27 and rod 32 are positioned by the opposing forces of vacuum in the pressure chamber 33 and the spring 28.

In operation, the bimetal spring in the regulator 12 thermally deforms in accordance with sensed temperature and controls the valve to modulate the vacuum supplied into the pressure chamber 33. The diaphragm 27 and thereby the rod 32 assume and equilibrium position at which the vacuum urging the diaphragm 27 leftwardly equals the rightward force of the diaphragm spring 28. If the sensed temperature rises above the desired value, the regulator 12 decreases the vacuum allowing the spring 28 to move the diaphragm 27 and rod 32 rightwardly to decrease the temperature. The opposite effect occurs if the temperature decreases below the desired value.

Figure 3:
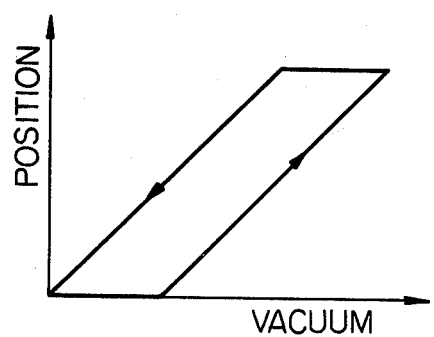
Figure 4:
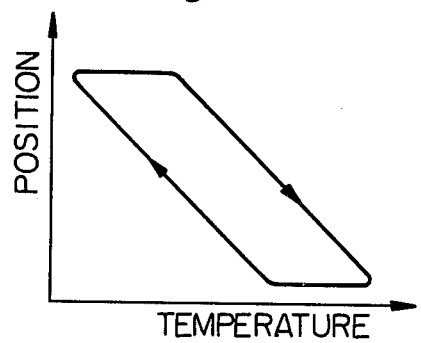

The temperature regulation of the system 11 is very poor for, among other reasons, a hysterisis effect which is illustrated in FIGS. 3 and 4. For each value of sensed temperature the regulator 12 produces a corresponding value of vacuum. Thus, the system 11 is open loop in the respect that there is no mechanical feedback from the actuator 24 to the regulator 12. The actuator 24 exhibits mechanical hysterisis due to mechanical friction in moving the temperature control door as illustrated in FIG. 3. FIG. 4 is obtained by combing FIGS. 2 and 3. In other words, due to the coefficient of static friction between the temperature control door and its supporting members, a certain change in temperature and thereby vacuum is required to produce any movement whatsoever of the door. This results in very poor temperature regulation. Although the piloted vacuum actuator described hereinabove reduces the hysterisis problem, the addition of a piloted vacuum actuator to the system 11 would still not produce accurate temperature control since there is no mechanical feedback from the actuator to the regulator, and the system would still be susceptible to erroneous operation caused by variations in intake manifold vacuum, deterioration of the diaphragm, pressure drops in the hose 23 and other factors. In addition, the system would still be difficult and expensive to mount since the regulator and actuator are separate and must be connected by the hose 23.

These problems are completely overcome by a thermopneumatic temperature control system 41 illustrated in FIG. 5 which comprises a thermopneumatic actuator 42 embodying the present invention. The actuator 42 is illustrated in detail in FIGS. 5 to 9.

The system 41 comprises an air conditioning duct 43 through which air is blown into the passenger compartment of an automotive vehicle by a fan 44 in the rightward direction as viewed in FIG. 5. An air conditioner evaporator 46 is disposed inside the duct 43 to cool air passing therethrough. A heater 47 is also disposed in the duct 43 downstream of the evaporator 46. Hot water from the vehicle cooling system is applied to the inlet of a valve 49 through a hose 48. The outlet of the valve 49 is connected to the inlet of the heater 47 through a hose 51. The outlet of the heater 47 is returned to the vehicle cooling system through a hose 52. When the valve 49 is opened, hot water is circulated through the heater 47 to heat air passing through the duct 43 to the passenger compartment.

The amount of air passing through the heater 47 is controlled by a temperature control door 53 which is pivotally supported by a shaft 54. The actuator 42 is connected to the door 53 and valve 49 through a link 56 in such a manner that the door 53 is pivoted clockwise thereby unblocking the heater 47 to a greater extent as the link 56 is retracted toward the actuator 42 or pulled upwardly. The link 56 opens the valve 49 to turn on the heater 47 except when the door 53 is in a closed position illustrated in phantom line. The more the door 53 is moved upwardly, the greater the volume of air which passes through the heater 47 and the higher the temperature of the air supplied into the passenger compartment through the duct 43. The intake manifold of the vehicle is symbolically designated as 57 and is connected to the actuator 42 through a hose 58. The passenger compartment of the vehicle is also symbolically shown and designated as 59, the compartment 59 being connected to the actuator 42 through a hose 61. An indicator 62 for setting the desired temperature in the passenger compartment 59 is disposed inside the compartment 59 for ease of adjustment by the vehicle operator and is connected to the actuator 42 through a cable 63. Air from the compartment 59 is caused to flow through the hose 61, actuator 42 and a hose 64 by means of an aspirator 66 provided to the duct 43. The aspirator 66 comprises a venturi tube 67 leading from the duct 43 through which pressurized air is blown from the duct 43. A tube 68 provided at the end of the hose 64 is coaxially disposed inside the venturi tube 67 in such a manner that air is sucked out of the tube 68 by the low pressure created in the venturi tube 67 due to the flow of air therethrough.

In operation, the desired temperature is set into the actuator 42 by the indicator 62 and the actuator 42 moves the link 56 to position the door 53. If the sensed temperature is above the desired value the actuator 42 will move the door 53 downwardly to reduce the temperature of the air being fed into the passenger compartment 59 to reduce the temperature. The opposite effect occurs if the sensed temperature is too low.

As best seen in FIG. 6, the actuator 42 comprises a diaphragm housing 71 and a valve housing 72 which is fixed to the left end of the diaphragm housing 71 by screws 73 (see FIG. 7). The housing 71 defines therein a pressure chamber 74. Similarly, the housing 72 defines therein a temperature chamber 76.

The right wall of the pressure chamber 74 is constituted by a flexible power diaphragm 77 which is fixed at its periphery to the right edge of the housing 71 by an annular cap 78. A spring retainer cap 79 is fixed to the center of the diaphragm 77 by a pin 81. A diaphragm spring 82 is compressed between the left end of the housing 71 and the cap 79, thereby urging the cap 79 and diaphragm 77 rightwardly. The pin 81 also fixes the link 56 and a cap 83 to the right side of the diaphragm 77 so that the diaphragm 77 and link 56 move in an integral manner.

The temperature chamber 76 has an inlet 85 connected to the hose 61 and an outlet 84 connected to the hose 64 so that air from the passenger compartment 59 is caused to flow through the temperature chamber 76 due to the action of the aspirator 66.

A generally U-shaped bimetal spring 86 is fixedly supported at its lower or right end by a block 87, which is in turn supported by a bolt 88 which threadingly passes therethrough. The bolt 88 is rotatably supported through the left wall of the housing 72 and extends externally therefrom. A compression spring 91 is disposed between the left wall of the housing 72 and the block 87 to take up lost motion and dampen vibration. A rod 89 extends from the left wall of the housing 72 and slidingly passes through the block 87 thereby aiding in the support of the block 87 and preventing rotation thereof.

An arm 92 is fixed to the bolt 88 by means of a setscrew 93. The cable 63 is connected to the end of the arm 92. Tension or slackening of the cable 63 caused by adjustment of the indicator 62 causes the arm 92 and bolt 88 to rotate and the block 87 to move left or right as viewed in FIG. 6 carrying the spring 86 therewith.

A vacuum modulator valve which is generally designated as 94 is provided to the housing 72 and comprises an outlet 96 which communicates with the pressure chamber 74 through a tube 97. A flow restriction 98 is provided in the tube 97. The outlet 96 leads from a valve chamber 99 defined within the housing 72.

A valve element 101 is supported by flexible diaphragms 102 and 103 which hermetically seal the temperature chamber 76 from the valve chamber 99 and pressure chamber 74. While the diaphragms 102 and 103 are equal in area, the diaphragm 102 may be made slightly larger than the diaphragm 103. The diaphragms 102 and 103 allow the valve element 101 to move axially. The right end of the valve element 101 is connected to the pin 81 through a valve or feedback spring 104. The upper or left end portion of the bimetal spring 86 resiliently engages with a shoulder 106 of the valve element 101 and urges the same leftwardly.

The left end of the valve element 101 is formed with an inlet valve seat 107 which communicates with the interior of the temperature chamber 76 through a passageway 108. Another inlet valve seat 109 communicates with the hose 58. A double headed valve element 111 is supported by the valve element 101. More specifically, the valve element 111 has a left ball (not designated) which closes the valve seat 109 when moved leftwardly into engagement therewith. The valve element 111 further has a right ball which is disposed to the right of the valve seat 107 inside the passageway 108 and blocks the same when the valve element 111 is moved rightwardly. The detailed construction of the valve 94 is shown in enlarged form in FIG. 8, and the detailed construction of the spring 86 and block 87 is most visible in FIG. 9.

In operation, the vehicle driver rotates the indicator 62 to set the desired temperature. This causes rotation of the bolt 88 and adjustment of the preload of the spring 86 against the shoulder 106 of the valve element 101. The spring 86 is compressed inwardly, and exerts a leftward force on the valve element 101. The valve spring 104 exerts a rightward force on the valve element 101. Then, although leftward and rightward forces extert on the diaphragms 102 and 103 respectively, these forces are counterbalanced each other because the diaphragm 102 are equal in area to the diaphragm 103, as mentioned above. Accordingly, the valve element 101 is not affected by these forces, but is affected by both the leftward force of the spring 86 and the rightward force of the spring 104 so as to be positioned. An increase in temperature in the temperature chamber 76, which corresponds to the passenger compartment temperature, causes the spring 86 to thermally deform leftwardly and exert a greater force on the valve element 101 against the force of the spring 104. The valve element 101 is positioned when the forces of the springs 86 and 104 thereon are equal. When the sensed temperature corresponds to the desired temperature, the valve element 101 attains an equilibrium position shown in FIG. 6 whereby the left and right balls of the valve element 111 block the valve seats 109 and 107 respectively. This seals the valve chamber 99 and thereby blocks communication between the pressure chamber 74, the temperature chamber 76 which is at atmospheric pressure and the hose 58 which conducts vacuum to the valve seat 109 from the intake manifold 57. Under equlibrium conditions, the vacuum in the pressure chamber 74 urging the diaphragm 77 leftwardly equals the force of the spring 82 which urges the diaphragm 77 rightwardly.

When the temperature in the passenger compartment 59 exceeds the desired temperature the spring 86 thermally deforms or expands leftwardly, thereby moving the valve element 101 leftwardly. The left ball of the valve element 111 abuts against the valve seat 109 blocking the same. The valve element 101 overtravels the valve element 111 with the result that the right ball of the valve element 111 unblocks the valve seat 107 thereby establishing communication between the temperature chamber 76 and the valve chamber 99 through the passageway 108.

This has the further effect of connecting the temperature chamber 76 to the pressure chamber 74 through the valve chamber 99 and tube 97, causing air at atmospheric pressure to bleed into the pressure chamber 74 reducing the level of vacuum. As a result, the spring 82 overcomes the force exerted on the diaphragm 77 by the vacuum in the pressure chamber 74 and moves the diaphragm 77 rightwardly. The link 56 moves with the diaphragm 77, moving the temperature control door 53 toward the closed position to reduce the temperature of air being forced through the duct 43 into the passenger compartment 59.

Rightward movement of the diaphragm 77 extends the valve spring 104 thereby increasing the rightward force thereof on the valve element 101 in opposition to the leftward force of the bimetal spring 86. The diaphragm spring 82 is designed to be much stiffer than the valve spring 104 so that the spring 104 has essentially no effect on the spring 82. The valve element 101 is moved rightwardly until the force of the spring 104 equals the force of the spring 86. At this point, which is the equilibrium position, the right ball of the valve element 111 closes the valve seat 107 and seals the pressure chamber 74.

The opposite effect occurs when the temperature drops below the desired value. The leftward force of the spring 86 on the valve element 101 is decreased and the spring 104 pulls the valve element 101 rightwardly. Due to the arrangement of the right ball of the valve element 111 and the valve seat 107, the valve element 111 is pulled rightwardly by the valve element 101 and the left ball of the valve element 111 unblocks the valve seat 109. This connects the pressure chamber 74 to the intake manifold 57 through the tube 97, valve chamber 99, valve seat 109 and hose 58. Thus, air is sucked out of the pressure chamber 74 increasing the level of vacuum.

As a result, the diaphragm 77 and link 56 are pulled leftwardly to further open the temperature control door 53. The spring 104 is slackened by the rightward movement of the diaphragm 77 and the force thereof on the valve element 101 decreases. The valve element 101 is moved leftwardly by the spring 86 until the spring forces are equal and the left ball of the valve element 111 seats against the valve seat 109 to seal the pressure chamber 74.

In summary, it will be seen that the link 56 is positioned by the diaphragm 77 as a function of the level of vacuum or negative gage pressure in the pressure chamber 74. The level of vacuum is determined by the valve 94 which is operated by the bimetal spring 86. Mechanical feedback from the diaphragm 77 to the valve 94 is provided by the feedback or valve spring 104 which provides closed loop control. Thus, the above mentioned drawbacks of the prior art are overcome and the present system 41 operates with extremely improved precision. Various obvious modifications to the actuator 42 such as replacing the double headed ball valve element 111 with a sleeve or functionally equivalent valve arrangement and operating the diaphragm assembly with positive gage pressure rather than vacuum such as from a Diesel engine supercharger will become immediately apparent to one skilled in the art.

While the diaphragms 102 and 103 are equal in area, the diaphragm 102 may be made slightly larger than the diaphragm 103.

Figure 10:
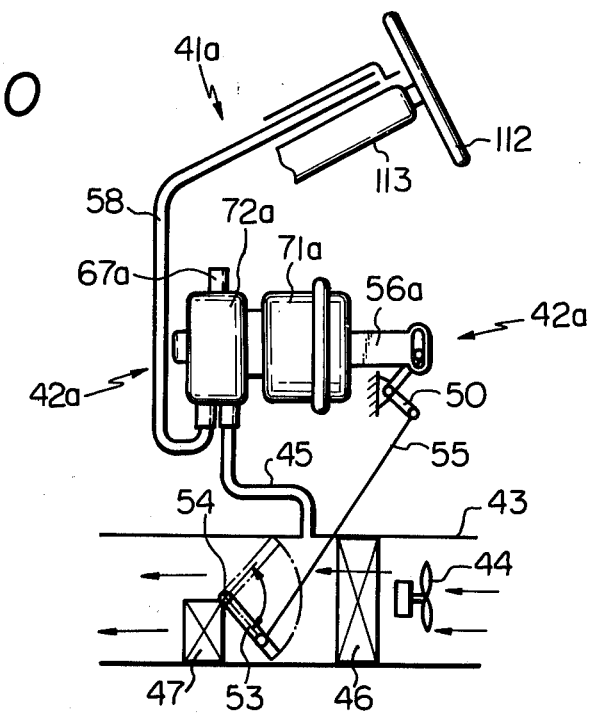
FIG. 10 is a schematic view of a first modification of the present actuator.
Figure 11:
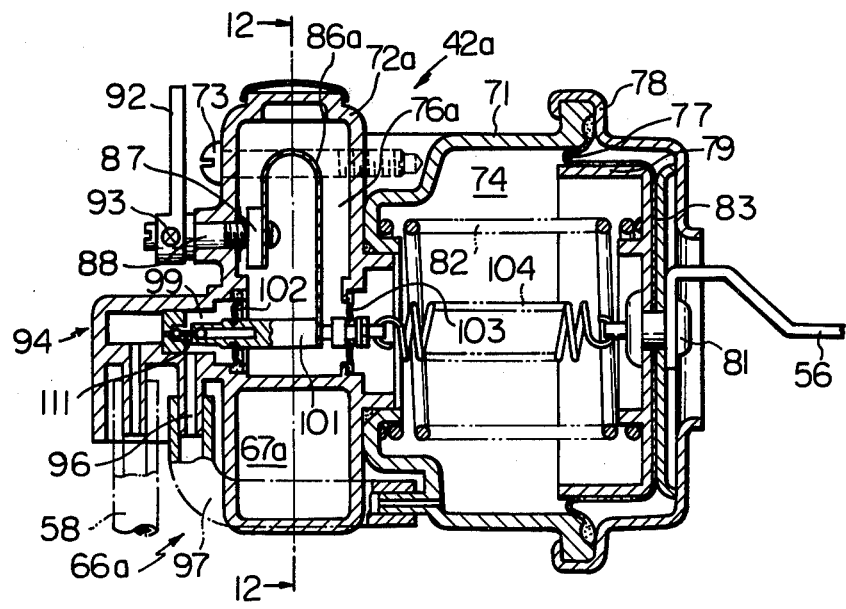
FIG. 11 is a longitudinal sectional view of the first modification.
Figure 12:
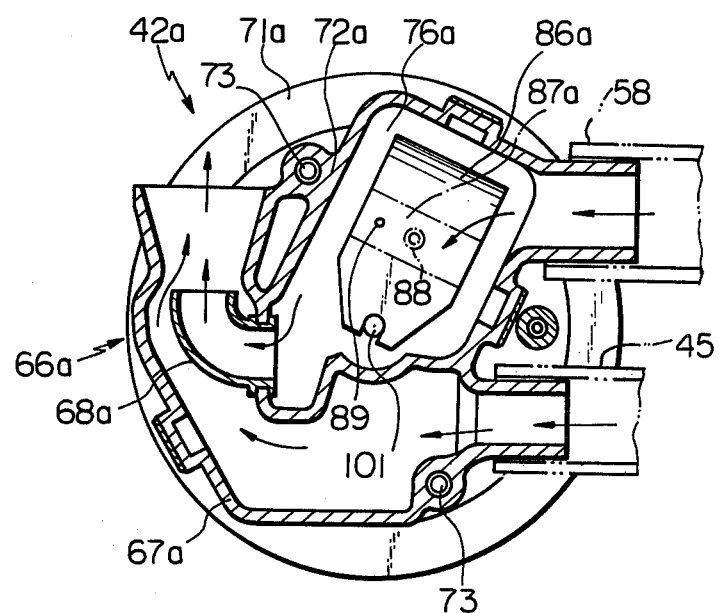
FIG. 12 is a section taken on a line 12—12 of FIG. 11.

FIGS. 10 to 12 illustrate a modification of the present actuator 42 in which an aspirator 66a is provided integrally with the actuator body. This facilitates installation even further since only a simple hose connection is necessary at the duct 43. Like elements are designated by the same reference numerals used in the embodiment of FIGS. 5 to 9 and elements which are essentially similar in function but modified in configuration are designated by the same reference numerals suffixed with the character "a". Further shown in FIG. 10 is a steering wheel 112 and steering column 113 which are located in the passenger compartment 59.

An actuator 42a comprises a valve housing 72a which is connected to the passenger compartment 59 through the hose 58. A link 56a is provided in shortened form and a bellcrank lever 50 and connecting link 55 are provided between the link 56a and door 53. The evaporator 46, heater 47 and door 53 are constructed and function in the same manner as above although their relative positions are reversed. Retraction of the link 56a into the housing 71a causes the temperature control door 53 to be opened and the air temperature to increase as above.

In the actuator 42a a venturi tube 67a and a tube 68a are provided as integral components of the housing 72a. The venturi tube 67a is connected to the duct 43 by a hose 45. The tube 68a leads directly from a temperature chamber 76a of the housing 72a. In operation, air blown through the venturi tube 67a from the duct 43 through the hose 45 creates a low pressure area at the restriction of the venturi tube 67a which sucks air from the temperature chamber 76a through the tube 68a. Air from the passenger compartment 59 fills the partial vacuum created in the temperature chamber 76a through the hose 58 to cause air circulation through the temperature chamber 76a. A bimetal spring 86a is reversed relative to the spring 86 and deforms inwardly in response to an increase in temperature to urge the valve element 101 leftwardly as above.

Figure 13:
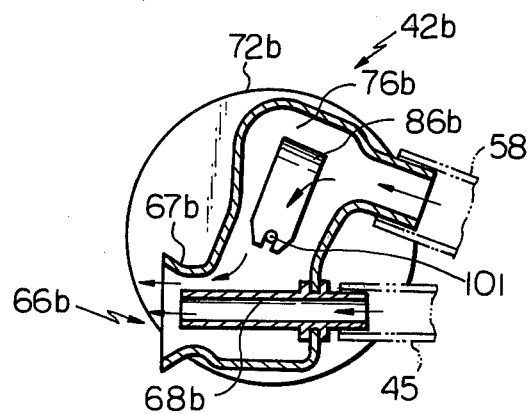
FIG. 13 is similar to FIG. 12 but shows an alternative arrangement.
Figure 14:
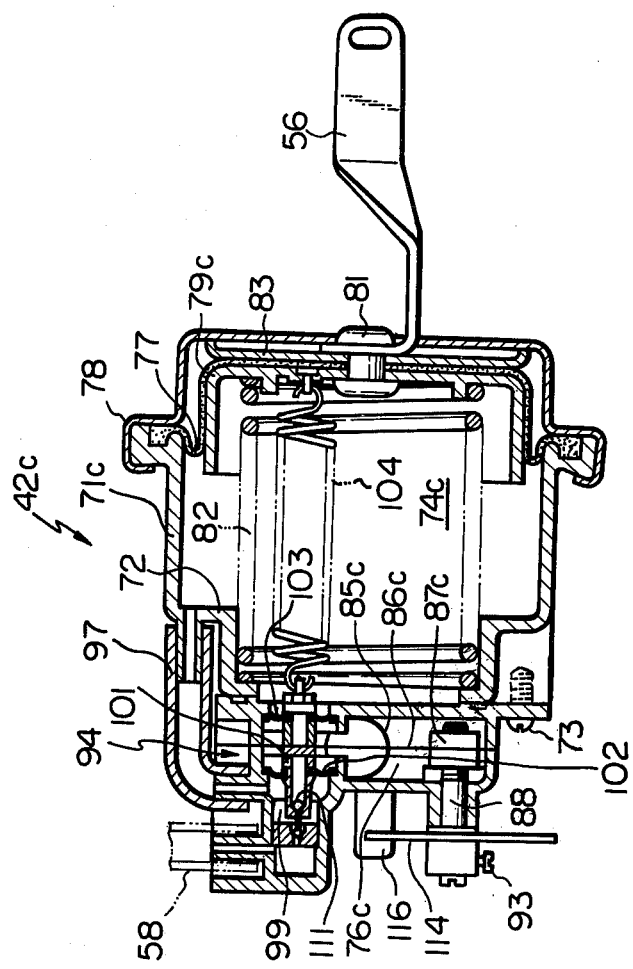
FIG. 14 is a longitudinal sectional view of a second modification of the present actuator.

FIG. 13 illustrates another modification of the actuator 42 in which corresponding elements are designated by the same reference numerals suffixed by the character "b". The embodiment of FIG. 13 is similar to that of FIGS. 10 to 12 except that in an aspirator 66b the relationship of the venturi tube 67a and tube 68a is reversed in FIG. 13. Provided integrally as part of a housing 72b, a venturi tube 67b leads from a temperature chamber 76b to the atmosphere and a tube 68b leading from the duct 43 is coaxially disposed inside the venturi tube 67b.

FIGS. 14 to 17 illustrate another modification of the actuator 42, in which corresponding elements are designated by the same reference numerals suffixed by the character "c". As a main point of difference the U-shaped bimetal spring 86 is replaced by a straight bimetal spring 86c, which thermally deforms leftwardly in response to an increase in temperature. Thus, the basic operation of an actuator 42c is essentially similar to that of the actuator 42. As another main point of difference, it will be noted that in the actuator 42 the inlet 85 and outlet 84 of the temperature chamber 76 are not axially aligned. This causes the air in the temperature chamber 76 to flow in a turbulent manner and minimize temperature gradients. Thus, the air acts on the spring 86 in a uniform manner.

Figure 15:
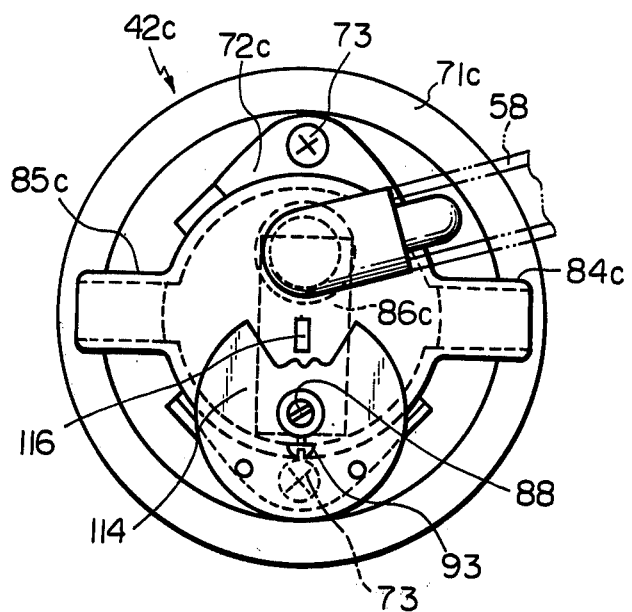
FIG. 15 is a rear elevation of the second modification.

In some cases where more rapid temperature response is required, it is desirable to provide as shown in FIG. 15 an inlet 85c and outlet 84c in axial alignment and furthermore to align the axes of the inlet 85c and outlet 84c with the center of the spring 86c. This causes essentially laminar flow through the temperature chamber 76c and concentration of the air stream on the central portion of the spring 86c. This causes the spring 86c to deform to a greater extent than if the air acted on the spring 86c in a uniform manner and greater response to variations in air temperature.

Figure 16:
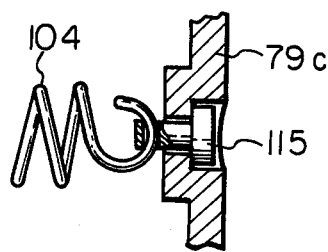
FIGS. 16 and 17 are enlarged sectional views of various portions of the second modification.

Several minor modifications are also illustrated in FIGS. 14 to 17. A limit plate 114 provided to the bolt 88 and a stop 116 provided to the housing 72c with which the limit plate 114 is engageable prevent excessive movement of the bolt 88 and spring 86c. As best seen in FIG. 16, the feedback spring 104 is not connected to the pin 81 and thereby to the center of the diaphragm 77 but to a spring retainer cap 79c by means of a stud 115. The stud 115 is offset from the central axis of the diaphragm 77 and rotatably fits in a hole (not designated) formed through the cap 79c. This allows the spring 104 to rotate as it extends and contracts, thereby eliminating variation of the spring constant as a function of the length of the spring 104.

Figure 17:
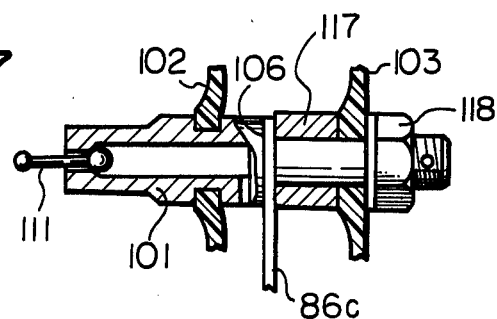

As illustrated in FIG. 17 the upper end of the spring 86c is connected to the valve element 101 by means of a resilient sleeve 117 and a nut 118 screwed onto the right end of the valve element 101. The valve element 101 passes through a hole (not designated) formed through the upper end of the spring 86c and the nut 118 is tightened so that the spring 86c is firmly held. The resilience of the sleeve 117 serves to dampen vibration of the spring 86c and valve element 101.

Figure 18:
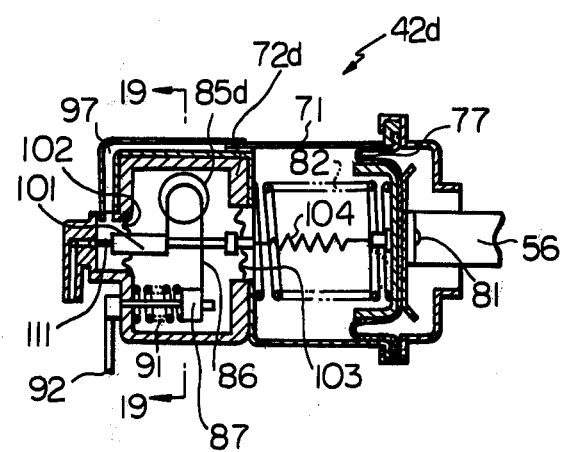
FIG. 18 is a simplified schematic view of a third modification of the present actuator.
Figure 19:
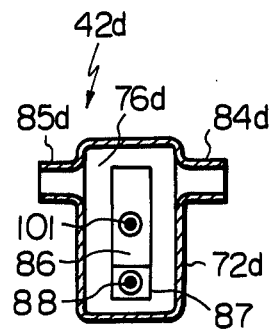
FIG. 19 is a section taken on a line 19—19 of FIG. 18.

FIGS. 18 and 19 illustrate another modification of the actuator 42 in which corresponding elements are designated by the same reference numerals suffixed by the character "d". An actuator 42d is essentially similar to the actuator 42 except that an inlet 85d and an outlet 84d of a temperature chamber 76d are axially aligned with each other and with the central or U-shaped portion of the spring 86.

In summary, it will be seen that the present invention provides a thermopneumatic actuator of greatly improved accuracy compared to the prior art. The present actuator is configured as an integral, compact unit which can be installed with substantially reduced space requirements and cost. Various modifications will become possible for those skilled in the art after receiving the teachings of the present disclosure without departing from the scope thereof.

What is claimed is:

1. A thermopneumatic actuator comprising:
    a housing defining therein a temperature chamber, a pressure chamber and a valve chamber;
    a first diaphragm hermetically sealing the valve chamber from the temperature chamber;
    a second diaphragm hermetically sealing the pressure chamber from the temperature chamber, the second diaphragm being equal in area to the first diaphragm;
    a power diaphragm constituting a wall of the pressure chamber;
    an output member fixed to the power diaphragm and extending externally of the housing;
    a diaphragm spring urging the power diaphragm and thereby the output member against fluid pressure in the pressure chamber;
    a valve having inlets communicating with a fluid pressure source and the atmosphere respectively, an outlet communicating with the pressure chamber and a movable valve element operatively supported by the first and second diaphragms for controlling communication between the inlets and the outlet;
    a thermally deformable spring disposed in the temperature chamber and being connected between the housing and the valve element; and
    a valve spring connected between the valve element and the power diaphragm in such a manner that a force of the valve spring opposes a force of the thermally deformable spring.

2. An actuator as in claim 1, in which the valve element is movable from a position in which the valve element connects the inlet which communicates with the fluid pressure source to the outlet through an equilibrium position in which the valve element blocks both inlets to a position in which the valve element connects the inlet which communicates with the atmosphere to the outlet.

3. An actuator as in claim 1, in which the temperature chamber communicates with the atmosphere, the inlet of the valve which communicates with the atmosphere communicating with the temperature chamber.

4. An actuator as in claim 1, in which the temperature chamber has an inlet and an outlet which are axially aligned.

5. An actuator as in claim 4, in which the inlet and outlet of the temperature chamber are aligned with a central portion of the thermally deformable spring.

6. An actuator as in claim 5, in which the thermally deformable spring has a U-shape.

7. An actuator as in claim 1, further comprising adjustor means for adjusting a preload of the thermally deformable spring.

8. An actuator as in claim 1, further comprising aspirator means for inducing fluid flow through the temperature chamber.

9. An actuator as in claim 8, in which the aspirator means comprises a passageway connected at one end to the outlet of the temperature chamber and venturi means coaxially surrounding an other end of the passageway.

10. An actuator as in claim 9, in which the aspirator means is integral with the housing.

11. An actuator as in claim 1, in which the pressure source is a source of air at negative gage pressure.

* * * * *